United States Patent [19]

Possati

[11] 4,077,130

[45] Mar. 7, 1978

[54] APPARATUS FOR MEASURING THE TAPER AND THE OUT-OF-ROUNDNESS OF A REVOLUTIONARY SURFACE OF A WORKPIECE

[75] Inventor: Mario Possati, Bologna, Italy

[73] Assignee: Finike Italiana Marposs, Soc. In Accomandita Semplice di Mario Possati & C., Bentivoglio, Italy

[21] Appl. No.: 736,464

[22] Filed: Oct. 28, 1976

[30] Foreign Application Priority Data

Nov. 13, 1975 Italy .................... 3584/75

[51] Int. Cl.² .......................... G01B 7/12; G01B 7/30
[52] U.S. Cl. ................... 33/174 L; 33/174 E; 33/178 E
[58] Field of Search ............ 33/174 E, 174 L, 174 Q, 33/178 E

[56] References Cited

U.S. PATENT DOCUMENTS

| 2,016,420 | 10/1935 | Engst | 33/174 L |
| 3,958,337 | 5/1976 | Anichini | 33/143 L |
| 3,958,338 | 5/1976 | Anichini et al. | 33/178 E |

FOREIGN PATENT DOCUMENTS

| 240,348 | 12/1960 | Australia | 33/174 E |
| 113,360 | 6/1954 | Germany | 33/174 E |
| 268,668 | 4/1970 | U.S.S.R. | 33/174 Q |

*Primary Examiner*—Richard E. Aegerter
*Assistant Examiner*—Richard R. Stearns
*Attorney, Agent, or Firm*—Stevens, Davis, Miller & Mosher

[57] ABSTRACT

An apparatus for measuring the taper and the out-of-roundness of a revolutionary surface of a workpiece, comprising a frame, at least two measuring devices carried by the frame which have moving feelers adapted to cooperate with two points of different cross-sections of the revolutionary surface and two measurement transducers adapted to provide signals responsive to the position of the feelers, and detecting and processing means connected to the transducers for providing the desired measurements. The measuring devices comprise a common support for the feelers; coupling means, arranged between the support and the frame for permitting displacements of the support with the feelers for carrying out the measurements. The coupling means include a first movable connection permitting displacements of the support substantially along a radial direction relative to the workpiece and a second movable connection permitting angular displacements of the support substantially in a longitudinal axial plane relative to the workpiece, and thrust means for applying a radial thrust to the support, in a radial direction towards the surface. The transducers are coupled to the support and the coupling means to provide a first signal responsive to the displacements occurring substantially in a radial direction and a second signal responsive to the angular displacements.

6 Claims, 1 Drawing Figure

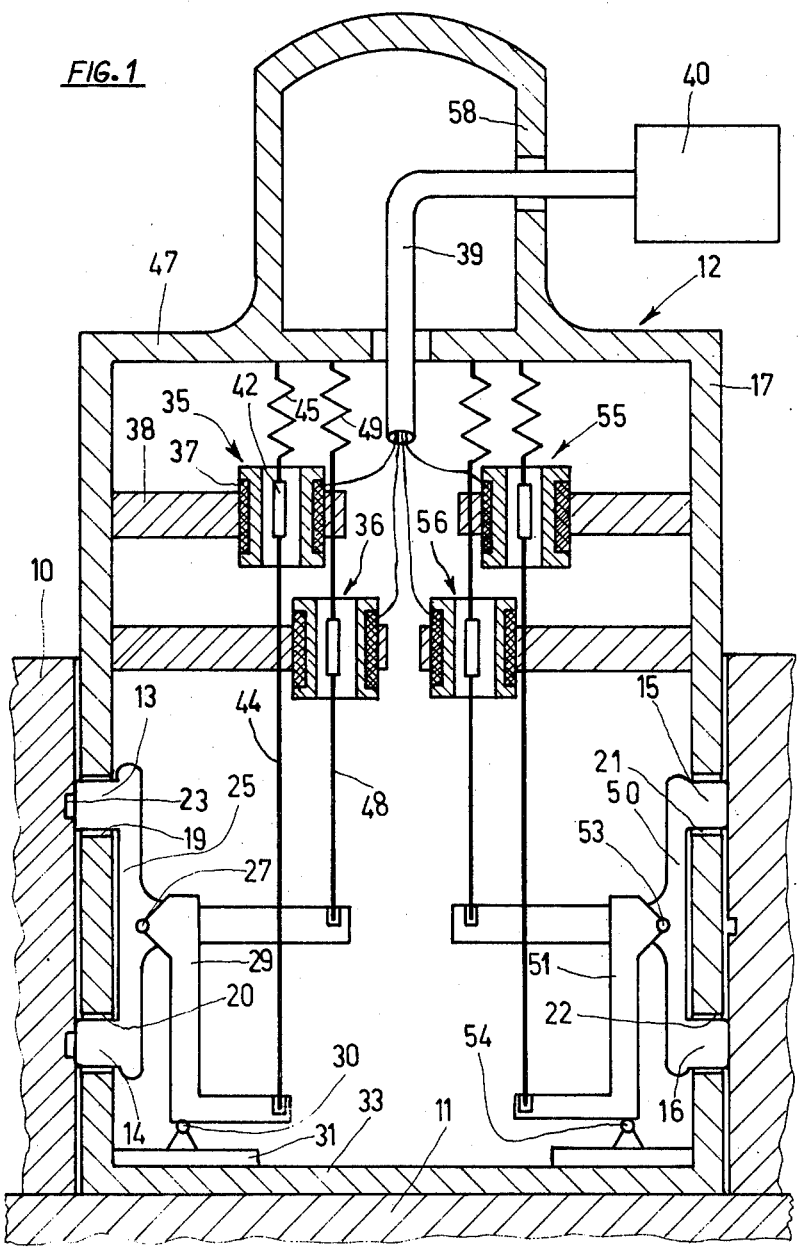

APPARATUS FOR MEASURING THE TAPER AND THE OUT-OF-ROUNDNESS OF A REVOLUTIONARY SURFACE OF A WORKPIECE

The present invention relates to an apparatus for measuring the taper and the out-of-roundness of a revolutionary surface of a workpiece, with a frame, at least two measuring devices carried by the frame which have moving feelers adapted to cooperate with two points of different cross-sections of the revolutionary surface, two measurement transducers adapted to provide signals responsive to the position of the feelers and detecting and processing means connected to the transducers for providing the desired measurements. Various apparatuses for carrying out measurements of cylindricity errors (taper) and out-of-roundness on revolutionary surfaces are already known.

As a matter of fact, for carrying out such measurements on internal surfaces, for example, an apparatus is known which includes a measuring plug having four movable arms with relevant feelers, and in which thrust means are coupled to the arms for urging the four feelers into contact with two pairs of diametrally opposite points of relevant cross-sections of the workpiece.

The measurements are carried out by causing a movement of relative revolution between the plug and the workpiece and by suitably processing the signals responsive to the position of the feelers, these signals being provided by suitable transducers.

Plugs having two moving arms only, with relevant feelers, may be used, too, but in such a case possible inaccuracies of said relative revolutionary movement involve, if they are not compensated, measurement errors.

Measurements of the type specified are getting more and more frequent in the field of the mechanical constructions and it is more and more important that they are carried out with greater quickness and accuracy. Often the surfaces involved have very small dimensions, such as to render difficult, if not impossible, to construct measuring apparatus of the conventional type.

An object of the invention is to provide a measuring apparatus which besides assuring an accurate, prompt and safe operation, permits one to reduce the waste of room space and money necessary for its construction, regulation, maintenance and repair.

These and other objects and advantages are attained through an apparatus of the type specified, which comprises, according to the invention, a common support for feelers; coupling means arranged between the support and a frame for permitting displacements of the support with the feelers for carrying out the measurements, the coupling means including a first movable connection permitting displacements of the support substantially along a radial direction relative to the workpiece and a second movable connection permitting angular displacements of the support substantially in a longitudinal axial plane relative to the workpiece; and thrust means for applying a radial thrust to the support, in a radial direction towards the surface; and wherein the transducers are coupled to the support and the coupling means for providing a first signal responsive to the displacements occurring substantially in a radial direction and a second signal responsive to the angular displacements.

The invention will be described in detail with reference to the accompanying drawing, given by way of a non-limiting example only, wherein;

FIG. 1 is a diagrammatic cross-sectioned view of a plug for measuring the cylindricity errors (taper) and the out-of-roundness of a cylindrical bore, according to a preferred embodiment of the invention.

With reference to FIG. 1, the workpiece 10, partially shown, consists of a connecting rod, resting on a bench 11. Measuring plug 12 measures the taper and the out-of-roundness of the bore of one of the ends of the connecting rod. Four knife feelers 13, 14, 15, 16 project from a substantially cylindrical protection shell 17, passing through openings 19, 20, 21, 22. The presence of grooves 23 in the bore does not affect the position of the feelers, due to their knife shape. Feelers 13, 14 are arranged at the ends of the opposite arms of a common support lever 25, tee-shaped, which is pivoted at an intermediate point 27 on an end of an arm of another lever 29, L-shaped. The other arm of lever 29 is in turn pivoted at a point 30 on a plate 31, integral with the internal part of base 33 of shell 17. The external surface of base 33 rests on bench 11.

Deviations from the nominal value of the diameters of the bores of the subsequent connecting rods measured cause in substance revolutionary displacements, about point 30, of the assembly constituted by levers 25, 29.

As a matter of fact, in the apparatus of FIG. 1 a change in the diameter causes a translation of lever 25 along a radial direction, a revolving of lever 29 about point 30 and a relative revolving of the two levers 25, 29 about point 27. The deviations are generally so small that the relative revolving of the two levers 25, 29 is negligible and the displacement of the same levers can be considered as a single revolving about point 30.

The possible taper of the bores causes revolutionary displacements of lever 25 about point 27, and therefore in an axial longitudinal plane with respect to the workpiece, and substantially no displacement of lever 29. The two kinds of displacements are detected by relevant differential transformer transducers 35, 36. Transducer 35 includes coils 37 fixed to shell 17 through a supporting arm 38, a cable 39 for the connection between coils 37 and a detecting and processing group 40, and a core 42 movable substantially along a longitudinal direction parallel to the workpiece axis.

The movable core 42 is fixed to a suspension including a wire 44, an end of which is fixed to the second arm of lever 29 — at the end opposite point 30 —, and a spring 45, — linked to the upper end 47 of shell 17 — which keeps wire 44 under tension and provides the necessary measurement pressure to feelers 13, 14.

Transducer 36 includes similar elements, among which a wire 48, an end of which is fixed to the end of the central arm of lever 25 and a spring 49 having, mainly, the task of keeping wire 48 under tension without affecting substantially the measurement pressure of feelers 13, 14. As it may be noticed in the drawing, the arrangement of levers 25, 29 and pivots 27, 30, is such that the ends of arms of levers 25, 29 to which wires 44, 48 are fixed, move substantially in an axial direction relative to plug 12, causing a similar displacement of the cores of transducers 35, 36.

Feelers 15, 16 are carried by a moving assembly similar to that coupled to feelers 13, 14. The assembly includes a tee lever 50, L-shaped lever 51, relevant pivots 53, 54 for levers 50, 51 and transducers 55, 56.

The measurements are carried out by making plug 12 rotate, through handle 58, of at least 180°.

Group 40 combines in a known way the signals given by transducers 35, 55 and provides, independently from possible displacements of the axis of plug 12, an indication of the out-of-roundness of the bore.

Similarly, through a per se known processing of the signals of transducers 36, 56 group 40 provides an indication of the cylindricity error (taper) of the bore.

By using a second plug of similar structure and connected to group 40 to carry out like measurements in the bore of the second end of the connecting end, it is possible to obtain other combined measurements, particularly measurements of twist and bend. It is evident that the apparatus of FIG. 1 can also be used, with simple modifications, for applications on automative measuring machines or in transfer machines. Besides it is possible to use a single pair of feelers coupled to a support lever, by realizing the revolutionary movement between the workpiece and measuring device through a high precision spindle, or compensating possible displacements of the axis of relative revolution. The practical realization of pivots 27, 30, 53, 54 can be made in a different way and it is possible to substitute, for pivots 30, linkages realizing proper radial translations of lever 25 as a consequence of changes of diameter.

The apparatus may also be used for stationary measurements (without relative revolution between workpiece and plug), possibly increasing the number of pairs of feelers and moving assemblies coupled to them.

What is claimed is:

1. Apparatus for measuring the taper and out-of-roundness of a revolutionary surface of a workpiece defining a longitudinal axis, comprising:
   a frame; and
   measuring means carried by the frame, including: a support; two feelers fixed to the support for cooperating with two points of different cross-sections of the revolutionary surface; connection means for coupling the support to the frame, the connection means including: a level; first pivoting means for coupling the support to the lever, said first pivoting means permitting angular displacements of the support substantially in a longitudinal axial plane relative to the workpiece; second pivoting means for coupling the lever to the frame, said second pivoting means permitting displacements of the lever and the support, the relevant displacements of the support occurring substantially along a radial direction relative to the workpiece; and transducer means for providing signals responsive to the position of said support, the transducer means comprising a first transducer including a first movable element, a first wire connecting the movable element to said support, first spring means for tensioning the wire and maintaining it substantially parallel to said longitudinal axis, and first circuit means for providing a signal responsive to said angular displacements, this signal being indicative of the taper of the revolutionary surface, and a second transducer including a second movable element, a second wire connecting the second movable element to said lever, second spring means for tensioning the second wire and maintaining it substantially parallel to said longitudinal axis, and second circuit means for providing a signal responsive to said displacements of the lever, this signal being indicative of the out-of-roundness of the revolutionary surface.

2. Apparatus for measuring the taper and out-of-roundness of a bore of a workpiece, comprising:
   a frame including a protection shell, substantially cylindrical, adapted to be placed within said bore, and defining openings for carrying out the measurements;
   measuring means carried by the frame, including: a support, substantially tee-shaped; two feelers arranged at the opposite arms of said support and projecting through said openings for contacting two points of different cross-sections of the bore; an L-shaped lever having a first arm and a second arm, the first arm having an end pivoted on an intermediate point of said tee-shaped support for permitting angular displacements of the support substantially in a longitudinal axial plane of said cylindrical protection shell, the other end of said first arm being pivoted on said frame for permitting displacements of the lever and the support, the relevant displacements of the support occurring substantially along a radial direction relative to the cylindrical shell; a first transducer for providing a signal responsive to the bore taper and including a movable element, a wire having an end coupled to the central arm of said support and the other end coupled to said movable element, spring means coupled to the movable element and to the frame for tensioning the wire and maintaining it substantially parallel to the axis of the cylindrical shell, and circuit means arranged on the frame for providing said signal responsive to taper; a second transducer for providing a signal responsive to the bore out-of-roundness and including a movable element, a wire having an end coupled to the second arm of said L-shaped lever, at the arm end opposite the end of the first arm of the L-shaped lever which is pivoted on said frame, and the other end coupled to the movable element of the second transducer, spring means coupled to the movable element of the second transducer, and to the frame for tensioning the wire of the second transducer and maintaining it substantially parallel to the axis of the cylindrical shell, and circuit means arranged on the frame for providing said signal responsive to the bore out-of-roundness.

3. The apparatus according to claim 12, comprising further measuring means similar to said measuring means and similarly arranged on said frame and a processing group connected with the circuit means of the measuring means and of the further measuring means, for providing indication of the taper and out-of-roundness of said bore.

4. The apparatus according to claim 3, further including a handle coupled to said frame for carrying out a displacement of revolution of the frame relative to the workpiece bore.

5. The apparatus according to claim 3, wherein the spring means of the measuring means and further measuring means are adapted to provide a contact pressure of the feelers of the measuring means and further measuring means on the bore surface.

6. The apparatus according to claim 5, wherein the feelers of the measuring means and further measuring means have a knife shape.

* * * * *

UNITED STATES PATENT AND TRADEMARK OFFICE
CERTIFICATE OF CORRECTION

PATENT NO. : 4,077,130
DATED : March 7, 1978
INVENTOR(S) : Mario POSSATI

It is certified that error appears in the above-identified patent and that said Letters Patent are hereby corrected as shown below:

Column 3, line 41, (line 10 of Claim 1 ), change "level" to

-- lever --

Column 4, line 48 (line 1 of Claim 3), change "12" to -- 2 --.

*Signed and Sealed this*

*Twenty-first* Day of *November 1978*

[SEAL]

Attest:

RUTH C. MASON
*Attesting Officer*

DONALD W. BANNER
*Commissioner of Patents and Trademarks*